(12) United States Patent
Suzuki

(10) Patent No.: US 10,838,102 B2
(45) Date of Patent: Nov. 17, 2020

(54) METHOD TO AUTOMATE PRESSURE TRANSIENT ANALYSIS (PTA) OF CONTINUOUSLY MEASURED PRESSURE DATA

(71) Applicant: Satomi Suzuki, Spring, TX (US)

(72) Inventor: Satomi Suzuki, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 612 days.

(21) Appl. No.: 15/677,768

(22) Filed: Aug. 15, 2017

(65) Prior Publication Data

US 2018/0100948 A1 Apr. 12, 2018

Related U.S. Application Data

(60) Provisional application No. 62/406,752, filed on Oct. 11, 2016.

(51) Int. Cl.
| | |
|---|---|
| *G01V 3/38* | (2006.01) |
| *E21B 49/00* | (2006.01) |
| *E21B 47/06* | (2012.01) |
| *G01V 3/34* | (2006.01) |
| *E21B 49/08* | (2006.01) |
| *G06F 17/10* | (2006.01) |

(52) U.S. Cl.
CPC ............ *G01V 3/38* (2013.01); *E21B 47/06* (2013.01); *E21B 49/008* (2013.01); *E21B 49/087* (2013.01); *G01V 3/34* (2013.01); *G06F 17/10* (2013.01)

(58) Field of Classification Search
CPC .......... G01V 3/38; G01V 3/34; E21B 49/008; E21B 47/06; E21B 49/087; G06F 17/10
See application file for complete search history.

(56) References Cited

U.S. PATENT DOCUMENTS

| 8,898,017 B2 | 11/2014 | Kragas et al. ................. 702/11 |
| 2007/0162235 A1* | 7/2007 | Zhan .................... E21B 49/008 702/6 |
| 2008/0210470 A1* | 9/2008 | Stewart .................. E21B 47/06 175/48 |
| 2018/0023389 A1* | 1/2018 | Pinto ....................... E21B 49/00 73/152.02 |

OTHER PUBLICATIONS

Wikipedia:Pattern Recognition <https://web.archive.org/web/20160625082114l/https://en.wikipedia.org/wiki/Pattern_recognition> retrieved by Archive.org on Jun. 25, 2016. (Year: 2016).*

(Continued)

*Primary Examiner* — Alexander Satanovsky
*Assistant Examiner* — Mark I Crohn
(74) *Attorney, Agent, or Firm* — ExxonMobil Upstream Research Company—Law Department

(57) ABSTRACT

Herein disclosed are methods and systems related to automatic pressure transient analysis (PTA). More particularly, herein disclosed are methods and systems related to automatic pressure transient analysis (PTA) of continuously measured pressure data associated with production or injection wells which utilizes in part pattern recognition analysis methods to determine key flow regimes in the measured data for more accurate determination of automatic pressure transient analysis (PTA) and determination of reservoir and well characteristic properties.

17 Claims, 2 Drawing Sheets

(56) References Cited

OTHER PUBLICATIONS

Al-Burdaikan, M. M. et al. (2013) "Pressure Transient Analysis of Data from Permanent Downhole Gauges," *SPE Digital Energy Conf. & Exhibition*, The Woodlands, TX, SPE 163723, Mar. 5-7, 2013, 24 pages.
Al-Kaabi, A. U. et al. (1990) "An Artificial Neural Network Approach to Identify the Well Test Interpretation Model: Application," $65^{th}$ *Ann. Tech. Conf. and Exh. of SPE*, New Orleans, LA, SPE 20552, Sep. 23-26, 1990, 8 pages.
Al-Kaabi, A. U. et al. (1993) "Using Artificial Neural Nets to Identify the Well-Test Interpretation Model," *SPE Formation Evaluation*, Sep. 1993, pp. 233-240.
Allain, O. (1988) "Use of Artificial Intelligence for Model Identification and Parameter Estimation in Well Test Interpretation," *Engineer's thesis, Stanford University*, 1988, 118 pages.
Allain, O. F. et al. (1990) "Use of Artificial Intelligence in Well-Test Interpretation," *JPT*, Mar. 1990, pp. 342-349.
Allain, O. et al. (1992) "A Practical ArtificialIntelligence Application in Well Test Interpretation," *SPE European Petro. Computer Conf.*, Stavenger, Norway, SPE 24287, May 25-27, 1992, pp. 245-255.
AlMaragh, A. M. et al. (2015) "Automatic Reservoir Model Identification using Artificial Neural Networks in Pressure Transient Analysis," *SPE North Africa Tech. Conf. and Exh.*, Cairo, Egypt, Sep. 14-16, 2015, SPE 175850-MS, 12 pages.
Athichanagorn, S. et al. (1995) "Automatic Parameter Estimation from Well Test Data using Artificial Neural Network," *SPE Ann. Tech. Conf. and Exh.*, Dallas, TX, SPE 30556, Oct. 22-25, 1995, pp. 249-262.
Bourdet, D. et al. (1989) "Use of Pressure Derivative in Well-Test Interpretation," *SPE Formation Evaluation*, Jun. 1989, pp. 293-302.
Chorneyko, D. M. (2006) "Real-Time Reservoir Surveillance Utilizing Permanent Downhole Pressures—An Operator's Experience," *SPE Ann. Tech. Conf. and Exh.*, San Antonio, TX, SPE 103213, Sep. 24-27, 2006, 8 pages.
Denny, D. (2011) "Automated Pressure-Transient Analysis—Use Smart Technology," *JPT—Reservoir Performance and Monitoring*, Sep. 2011, pp. 51-54.
Ershaghi, I. et. al (1993) "A Robust Neural Network Model for Pattern Recognition of Pressure Transient Test Data," *SPE Ann. Tech. Conf. and Exh.*, Houston, TX, SPE 26427, Oct. 3-6, 1993, 18 pgs.
Fair, C. et al. (2014) "Using the Results from Automated Petroleum Engineering Calculations to Accelerate Decision Workflows," *SPE Asia Pacific Oil & Gas Conf. and Exh.*, Adelaide, Australia, SPE-171512-MS, Oct. 14-16, 2014, 21 pages.
Guyaguler, B. et al. (2001) "Automated Reservoir Model Selection in Well Test Interpretation," *SPE Ann. Tech. Conf. and Exh.*, New Orleans, LA, SPE 71569, Sep. 30 to Oct. 3, 2001, 9 pages.
Horne, R. N. (1995) "Modern Well Test Analysis: A Computer-Aided Approach," *Petroway Inc. $2^{nd\ Ed.}$*, May 1995, Palo Alto, CA, pp. 9-30.
Horne, R. N. (2007) "Listening to the Reservoir—Interpreting Data from Permanent Downhole Gauges," *JPT*, Dec. 2007, pp. 78-86.
Houze, O. P. et al. (1992) "A Hybrid Artificial Intelligence Approach in Well Test Interpretation," $67^{th}$ *Ann. Tech. Conf. and Exh.*, Washington, DC, SPE 24733, Oct. 4-7, 1992, pp. 765-774.
Houze, O. et al. (2011) "New Methods Enhance the Processing of Permanent Gauge Data," *SPE Middle East Oil and Gas Show and Conf.*, Manama, Bahrain, SPE 139216, Sep. 25-26, 2011, 12 pages.
Houze, O. et al. (2012) *KAPPA Engineering Software Ecrin 4.30 Users Manual*, Chapter 1, 18 pages.
Houze, O. et al. (2012) *KAPPA Engineering Software Ecrin 4.30 Users Manual*, Chapter 6, 55 pages.
Houze, O. et al. (2012) *KAPPA Engineering Software Ecrin 4.30 Users Manual*, Chapter 7, 53 pages.
Houze, O. et al. (2012) *KAPPA Engineering Software Ecrin 4.30 Users Manual*, Chapter 8, 57 pages.
Knabe, S. et al. (2008) "Intelligent Continual Right-Time Analysis of Field Data as a Service," *SPE Intelligent Energy Conf. and Exh.*, Amsterdam, The Netherlands, SPE 111342, Feb. 25-27, 2008.
Kumoluyi, A. O. et. al (1995) "Identification of Well-Test Models by Use of Higher-Order Neural Networks," *SPE Computer Applications*, Dec. 1995, pp. 146-150.
Mueen, A. et al. (2015) "Finding Repeated Structure in Time Series: Algorithms and Applications," *SDM 2015 Tutorial Presented at 2015 Int'l Conf. on Data Mining*, Vancouver, Canada, Apr. 30-May 2, 2015, 119 pages.
Oilfield Data Services, Inc. (2014) "Real-Time, Automated & Semi-Automated Petroleum Engineering Software Modules," Brochure, 2 pages.
Press, W. H. et al. (1992) *Numerical Recipies in C: The Art of Scientific Computing*, Cambridge University Press, $2^{nd}$ Ed., May 1992, Chapter 10, pp. 394-405.
Rees, H. et al. (2011) "Automated Pressure Transient Analysis—Using Smart Technology," *SPE Digital Energy Conf. and Exh.*, The Woodlands, TX, SPE 144327, Apr. 19-21, 2011, 7 pages.
Shyeh, J. J. et al. (2008) "Examples of Right-Time Decisions from High Frequency Data," *SPE Intelligent Energy Conf. and Exh.*, Amsterdam, The Netherlands, SPE 112150, Feb. 25-27, 2008, 14 pages.
Sinha, S. et al. (1996) "Well-Test Model Identification with Self-Organizing Feature Map," *SPE Computer Applications*, Aug. 1996, pp. 106-110.
Suzuki, S. et al. (2009) "Automatic Detection of Pressure-Buildup Intervals from Permanent Downhole Pressure Data Using Filter Convolution," *SPE Annual Tech. Conf. and Exh.*, New Orleans, LA, SPE 125240, Oct. 4-7, 2009, 14 pages.
Zakaria, A. S. et al. (2011) "Application of Genetic Algorithms to the Optimization of Pressure Transient Analaysis of Water Injectors using Type Curves," *Society of Petroleum Engineers, SPE European Formation Damage Conf.*, The Netherlands, SPE-143386, 12 pages.

* cited by examiner

METHOD TO AUTOMATE PRESSURE TRANSIENT ANALYSIS (PTA) OF CONTINUOUSLY MEASURED PRESSURE DATA

CROSS REFERENCE TO RELATED APPLICATIONS

This application claims the priority benefit of U.S. Patent Application 62/406,752 filed Oct. 11, 2016 entitled Method to automate pressure transient analysis (PTA) of continuously measured pressure data, the entirety of which is incorporated by reference herein.

FIELD

Herein disclosed are methods and systems related to automatic pressure transient analysis (PTA). More particularly, herein disclosed are methods and systems related to automatic pressure transient analysis (PTA) of continuously measured pressure data associated with production or injection wells and determination of reservoir and well characteristic properties.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The methods for automatic pressure transient analysis (PTA) have been investigated for decades, even prior to the emergence of permanent downhole measurement. Allain et al. (Allain, 1988; Allain and Horne, 1990) proposed an automatic PTA method that automatically diagnoses flow scenario from log-log pressure derivative plot utilizing a pattern recognition technique called symbolic representation. Once the flow scenario is identified, automatic model response matching (i.e. log-log type curve matching) is performed using an optimization technique to invert reservoir and well properties (e.g. permeability, skin factor, extrapolated pressure p* etc.) from pressure data. Later, the method was hybridized with artificial neural network (ANN) method (Allain and Houze, 1992; Houze and Allain, 1992). The use of ANN for automatic PTA, using the similar workflow as used by Allain, has also been actively investigated by Al-Kaabi and Lee (1990, 1993), Ershaghi et. al. (1993), Athichanagorn and Horne (1995), Kumoluyi et. al. (1995), Sinha and Panda (1996) and AlMaraghi and El-Banbi (2015). Guyaguler and Horne automated entire workflow of PTA using genetic algorithm (GA) for the optimization. None of these approaches have been successfully commercialized as automatic PTA workflow mainly because (1) all of these approaches attempt to automate PTA workflow that utilizes model response matching (i.e. log-log type curve matching), which is difficult even when computer-aided manual analysis is performed because, in most cases, actual pressure data does not exactly follow theoretical model response and often contaminated by non-subsurface origin phenomena such as wellbore dynamics, and (2) majority of these approaches utilize ANN method that requires a "training process" for the pattern recognition, which due to the large amount of historical data required, is impractical to utilize efficiently in real world applications. Later, Zakaria et. al. (2011) eliminated the automatic flow scenario diagnostics process from the automatic PTA workflow and, by imposing a particular flow scenario which is selected by an expert for the analysis of the well in question, performed automatic log-log type curve matching using genetic algorithm (GA) for the optimization. This approach was commercially applied to the analysis of injection fall-off test.

As permanent downhole measurement of pressure has become common practice in the industry, continuous monitoring of reservoir properties and well condition through PTA of permanent gauge pressure has been proposed as a reservoir management workflow that enables proactive surveillance decisions to be made in a timely manner. However, manual PTA of continuously measured pressure data is generally a laborious and time-consuming task. Due to the increased demand for the automation of such process, automatic PTA software, which performs the analysis on real-time basis by reading permanent downhole gauge (PDHG) pressure data, has been developed and commercially applied on the basis of internal use. Some of this software utilizes simpler approaches to perform automatic analysis as compared to previously proposed methods: for example, instead of performing automatic model response matching (i.e. log-log type curve matching), as well as performing semi-log straight-line analysis (e.g. MDH analysis, Horner analysis) to invert reservoir and well properties from pressure data. In addition, instead of attempting to automatically identify flow regimes from a log-log derivative plot, the software simply finds the first instance of radial flow that appears as a "flat derivative" on a log-log derivative plot. These approaches require the utilization of user-specified criteria, defined on an individual well basis, for automatically finding the first instance of radial flow instead of using artificial intelligence methods such as pattern recognition, such as ANN.

Problems with these software models include limitations that are a function of their workflow methods. For instance, the software performs semi-log straight-line analysis automatically by using a regression method. Such regression methods often fail due to outliers in actual measured data. Additionally, the software automatically finds the first flat derivative on a log-log derivative plot based on user-specified criteria (e.g., the starting point of search on x-axis of the plot) to identify the radial flow period. However, such methods often misidentify the radial flow period by erroneously finding the flat derivative that appeared on the plot due to noise of data or effect of non-subsurface origin phenomena (e.g., wellbore dynamics). Both of these methods result in an incorrect analysis of the reservoir and well properties (e.g., permeability, skin factor, extrapolated pressure, etc.).

There exists a need in the art for new methods and systems possessing more accurate modeling of automatic pressure transient analysis (PTA) for production and injection wells, such as, but not limited, those used in oil or gas production.

SUMMARY

An embodiment disclosed herein is an automated pressure transient analysis (PTA) process, comprising:
a) recording continuously measured well pressure data and well flow rate data from a well located in a reservoir;
b) identifying pressure buildup intervals or pressure fall-off intervals from the well pressure data;

c) generating a log-log derivative plot of the well pressure data for at least one of the intervals;

d) identifying a sequence of the flow regime sub-intervals in the log-log derivative plot for the at least one interval; and e) identifying if a mid-time radial flow sub-interval is found in the log-log derivative plot;

wherein if a mid-time radial flow sub-interval is found in the log-log derivative plot, then:

f) identifying a value of the semi-log derivative within the mid-time radial flow sub-interval;

g) calculating at least one well/reservoir property selected from a permeability, k, a skin factor, s, and an extrapolated pressure, p*, based on the value of the mid-time radial flow; and h) based on the at least one well/reservoir property calculated in step g), performing at least one of:
- shutting in the well or another well located in the reservoir;
- drilling an additional well in the reservoir;
- adjusting the pressure or flow of a production well in the reservoir;
- adjusting the pressure or flow of an injection well in the reservoir;
- adjusting a composition of an injection fluid introduced into an injection well in the reservoir; and
- performing maintenance on the well or another well located in the reservoir.

In another embodiment disclosed herein is an automated pressure transient analysis (PTA) process, comprising:

a) recording continuously measured well pressure data and well flow rate data from a well located in a reservoir;

b) identifying pressure buildup intervals or pressure fall-off intervals from the well pressure data;

c) generating a log-log derivative plot of the well pressure data for at least one of the intervals;

d) identifying a sequence of the flow regime sub-intervals in the log-log derivative plot for the at least one interval; and e) identifying if a mid-time radial flow sub-interval is found in the log-log derivative plot;

wherein if a mid-time radial flow sub-interval is found in the log-log derivative plot, then:

f) identifying a value of the semi-log derivative within the mid-time radial flow sub-interval;

g) calculating at least one well/reservoir property selected from of a permeability, k, a skin factor, s, and an extrapolated pressure, p*, based on the value of the mid-time radial flow;

h) creating one or more digital files that contain the calculated well/reservoir properties and log-log derivative plots with description of identified flow regime sub-intervals; and i) storing the created digital files onto a computer, local network and/or repository database.

In another embodiment herein is a automated pressure transient analysis (PTA) system, comprising:

a) a reservoir;

b) at least one well located in the reservoir;

c) at least one pressure gauge capable of continuously measuring the well pressure data;

d) at least one of flow meter capable of continuously measuring the well flow data, a virtual metering system capable of continuously estimating the well flow data, and an allocation system capable of continuously allocating the well flow data using allocation factor; and e) a computing system which records the well pressure data and well flow data; the computing system comprising software for an automated pressure transient analysis (PTA) and a pattern recognition algorithm;

wherein the computing system receives a series of pressure buildup intervals or pressure fall-off intervals and determines the mid-time radial flow (RF) sub-interval for each interval, where such radial flow (RF) sub-interval exists in the interval.

BRIEF DESCRIPTION OF THE DRAWINGS

The advantages of the present techniques are better understood by referring to the following detailed description and the attached drawings, in which.

DETAILED DESCRIPTION OF THE EMBODIMENTS

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

Figure 1:
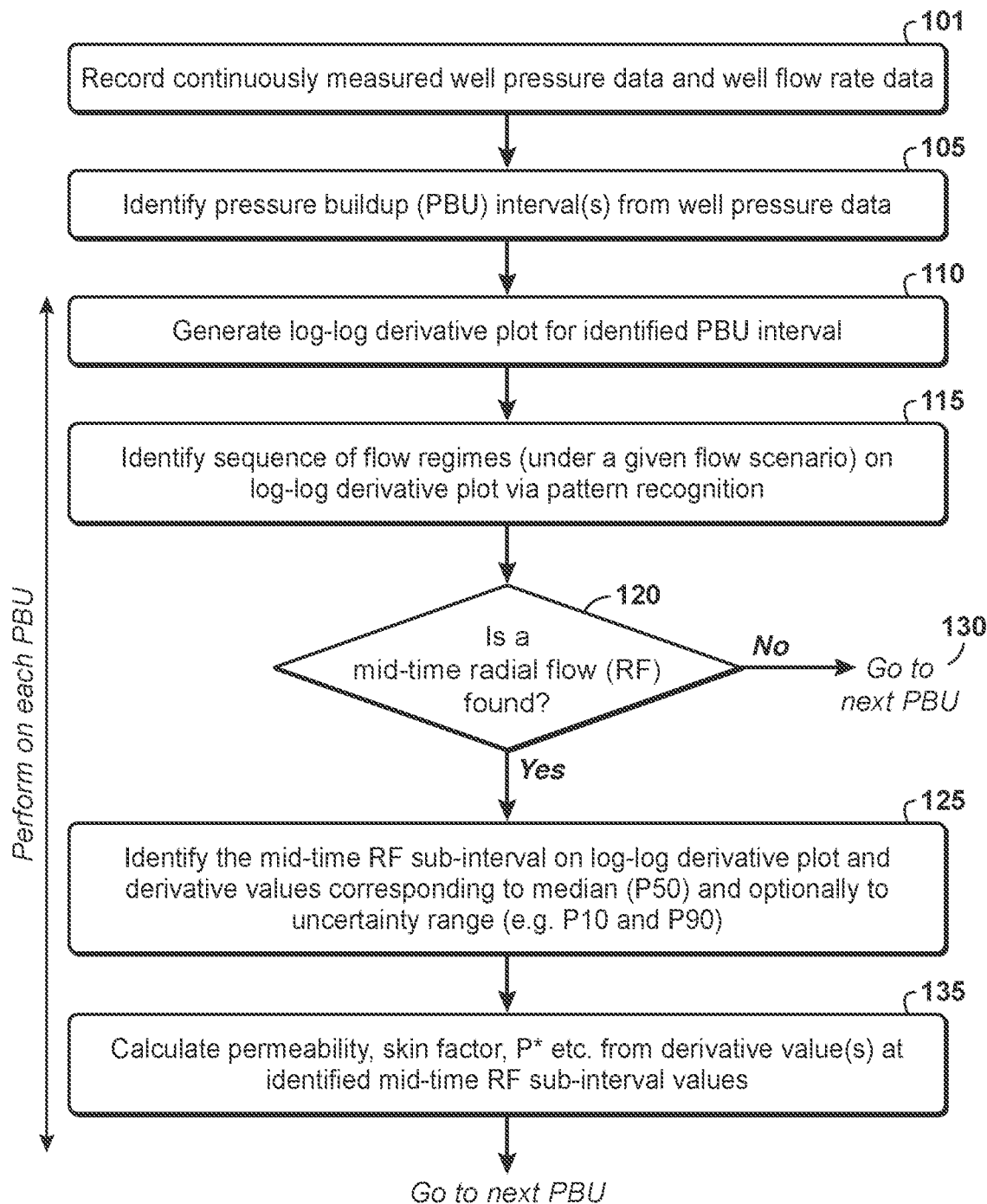
FIG. 1 illustrates a workflow embodiment for a process of automatic pressure transient analysis (PTA) as described herein as applied to production wells.

The processes disclosed herein provide a new workflow of automatic PTA of continuously measured pressure data that mitigates the problems and limitations of the prior art mentioned above. FIG. 1 illustrates an embodiment of the workflow of an automatic pressure transient analysis (PTA) herein as applied to production wells. It should be noted that this same process may be applied to and used in conjunction with injection wells, by replacing the pressure buildup (PBU) with pressure fall-off (PFO) in the workflow process as shown. This workflow does not attempt to automatically identify flow scenario of pressure transient behavior of the well to be analyzed. In other words, in the process described herein, engineers have to perform a manual PTA on a (i.e., a single) selected PBU (or PFO) to identify a flow scenario. Once the flow scenario is identified for the well, the processes as described herein perform automatic PTA on all other PBUs (or PFOs) observed at the well, which can be more than several dozens, and reports the results. It should be noted that while the processes and systems as described herein and shown in FIG. 1 may be illustrated using pressure buildup (PBU), the same processes may apply to using pressure fall-off (PFO) in place of PBU where described.

The processes and systems herein can be implemented on either historic data or real-time data. As depicted in FIG. 1, the well pressure data and the well flow rate data is obtained (101). The flow rate can be either a measured rate (e.g. flow meter data), an estimated rate (e.g. virtual metering), or an allocated rate. These flow rate measurements may include being obtained from at least one of a flow meter capable of continuously measuring the well flow data, a virtual metering system capable of continuously estimating the well flow data, or an allocation system capable of continuously allocating the well flow data using allocation factor. Then, pressure buildup (PBU) intervals, which are long enough for PTA, are automatically identified by using the pressure data only from the well (105). A method to automatically identify PBU intervals has been developed and published (see Suzuki and Chorneyko, 2009). Note that these automatic PBU identification methods typically only utilize pressure data and do not utilize the well flow rate because the flow rate estimated or allocated at individual wells are often not accurate enough to identify the start time of PBU.

Continuing with FIG. 1, once PBU is identified, log-log derivative plot is automatically generated for the PBU (110). The semi-log derivative to be plotted on the log-log derivative plot is calculated by a differentiation algorithm such as the method proposed by Bourdet et al. (1989) in order to handle noisy pressure data. Then, by using a pattern recognition algorithm, the sequence of flow "regimes" (or as may be referred to herein as "sub-intervals") consisting of early time, mid-time and late time flow sub-intervals, which is anticipated under the given flow scenario, is automatically determined by the system as shown on the log-log derivative plot (115).

Figure 2:
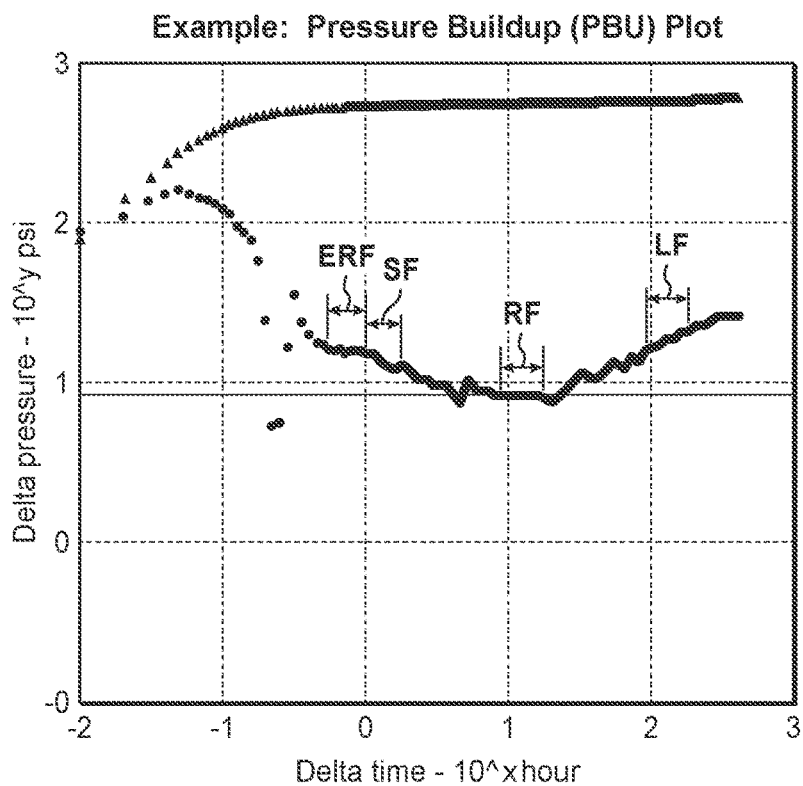
FIG. 2 illustrates an example of automatic PTA performed by using an embodiment of the methods as described herein. Line indicated by triangle legend: pressure change from the start of PBU, Line indicated by circle legend: derivative (=semi-log derivative), SF: spherical flow, RF: radial flow, and LF: linear flow.

FIG. 2 shows an example of log-log derivative plot and the sequence of flow regimes automatically identified by applying this invention. The flow scenario of pressure transient behavior of the well in FIG. 2, which is identified by manual PTA on one selected PBU as stated above, is partially penetrated well in channel sand. The sequence of flow regimes anticipated under such a flow scenario and the pattern of derivative corresponding to each flow regime (or "subinterval") for the example as illustrated in FIG. 2 are (1) early time radial flow (ERF): pattern of derivative=flat, (2) spherical flow (SF): pattern of derivative=negative half slope, (3) mid-time radial flow (RF): pattern of derivative=flat, and (4) late time linear flow (LF): pattern of derivative=positive half slope. In this example, ERF and SF correspond to early time flow sub-intervals, RF to mid-time flow sub-interval, and LF to late time flow sub-interval. However, early time radial flow (ERF) is often masked by wellbore storage effect. The flow regime that is used for estimating reservoir and well properties (e.g., permeability, k, skin factor, s, extrapolated pressure, p*, etc.) is the mid-time radial flow (RF). In order to discover the position of the mid-time radial flow (RF) on the log-log derivative plot, this invention automatically identifies the sequence of early time, mid-time and late time flow sub-intervals, e.g. SF (=negative half slope derivative)→RF (=flat derivative) →LF (=positive half slope derivative) in this example, using a pattern recognition algorithm as depicted in FIG. 2. It should be noted that the early time subinterval may not always correspond to a spherical flow (SF) regime and the late time subinterval may not always correspond to a linear flow (LF) regime as illustrated by this example, but the actual types of these early time and late time flow regimes can be determined by one of skill in the art based on the type of well and reservoir in which this process is being employed. The mid-time flow regime being identified by the automated methods herein, will however, always be a mid-time radial flow (RF) regime (i.e., sub-interval). The PTA herein has the ability to identify the early time flow sub-interval by a particular slope, which is specific to a geometry of flow streaming into the well at early time, in the log-log derivative plot; identify the mid-time radial flow (RF) sub-interval by a substantially zero slope in the log-log derivative plot; and identify the late time flow sub-interval by a particular slope, which is specific to a geometry of flow streaming into the well at late time, in the log-log derivative plot.

Returning to the description of the processes of this invention as outlined in FIG. 1, if a mid-time radial flow (RF) regime is identified by the pattern recognition (120), the process proceeds to next step of the process to locate the horizontal line to the mid-time RF sub-interval on the log-log derivative plot preferably corresponding to median value of the mid-time RF sub-interval, P50 (125) as depicted in FIG. 1 (see "YES" answer in diamond decision block in FIG. 1). While the median or P50 value of the mid-time RF sub-interval is the most logical value to utilize herein (and is utilized in this example as well as the flow chart in FIG. 1), any value for RF within the mid-time RF sub-interval (i.e., any value between the calculated min and max values of RF within the within mid-time RF subinterval) may be selected. For example, the calculated RF value may be the median value of the mid-time RF value over the sub-interval or the average value of the mid-time RF over the subinterval. The calculated RF value may alternatively be a value that is +/−a given percentage of the median value or average value, for example within 5%+/−, 10%+/−, or 25%+/−, of the overall mid-time RF range of the mid-time RF subinterval from the median RF value or from the average RF value. It should be noted that the identification of flow sub-intervals (e.g., for a partially penetrated well in channel sand) had been performed on a single PBU which is different from the one depicted in FIG. 2. Such analysis is conducted through the visual inspection of a log-log derivative plot (i.e., manual PTA), prior to the implementation of automatic PTA workflow. In other words, the system needs to be informed of the flow scenario anticipated in the well. Based on the information, the system automatically identifies the positions of flow regimes/sub-intervals (e.g., SF, RF, LF) associated with the flow scenario on multiple PBUs of the same well which are not visually inspected. The patterns of derivative corresponding to various flow regimes and the association between flow scenarios and flow regimes are well studied and documented in users manuals of commercial software (e.g. KAPPA software Ecrin 4.30 user's manual, DDA Book). If radial flow (RF) is not identified by the pattern recognition, the process proceeds to next PBU (130) as depicted in FIG. 1 (see "NO" answer in diamond decision block in FIG. 1).

In this example, a pattern matching algorithm based on similarity search is utilized for the pattern recognition. Specifically, the algorithm searches the pattern of data points which is most similar to the pattern corresponding to the flow regime in question by scanning various sizes of windows on data points of semi-log derivative. In the example of FIG. 2, the system first attempts to discover the spherical flow regime (SF) on the plot. The pattern of derivative corresponding to SF is a sub-interval with a straight line with negative half slope, which is a query pattern of this search. The algorithm scans a window on the plot and, at each position of x-axis of the plot, finds the position of y-axis of the window that maximizes similarity between the query pattern and data points within the window. The measure of similarity is the distance between the data points and the query pattern. The search for the y-axis position that achieves the maximum similarity is performed by a one-dimensional optimization algorithm such as Brent's method. Once the window is scanned through the x-axis, the x-axis position of the window that achieves the best similarity between the query pattern and data points is identified from the similarity distances calculated at all x-axis positions. This operation is performed for every possible window sizes and finally, the set of data points that exhibits the maximum similarity to the query pattern with the maximum window size is selected as SF. Then, the same search is conducted for radial flow regime (RF), using horizontal straight line sub-interval as a query pattern, by scanning windows only over the right hand side of the discovered SF sub-interval. Once the set of data points that matches to the query pattern of an RF sub-interval is discovered, the algorithm attempts to confirm that this set of data points is the most plausible mid-time RF sub-interval. This confirmation is needed to avoid the algorithm finding a false pattern and identifying it as the mid-time RF sub-interval. In order to perform such confirmation, the algorithm searches for another set of data points that matches to the query pattern of RF by scanning windows over the data points between previously discovered RF and SF. This operation is repeated in recursive manner until the system confirms that no more set of points that matches to the query pattern of RF exists between SF and previously found RF patterns. If multiple sets of data points are discovered as candidates of RF, the point set which is located at the lowest position of y-axis is selected as the mid-time RF sub-interval. Finally, the linear flow sub-interval (LF) is searched by the same manner, using positive half-slope straight line sub-interval as a query pattern, by scanning windows only over the right hand side of the discovered RF sub-interval. As shown in FIG. 2, the sequence of SF→RF→LF is identified by the automatic pattern recognition without any human intervention. Although the method performs exhaustive similarity search, the sequence of flow regimes/subintervals in FIG. 2 are discovered within 10 seconds using a standard commercial 64 bit desktop computer.

Continuing with FIG. 1 where a mid-time RF sub-interval is found in the PBU, once the sequence of flow regimes is identified, the present method can calculate a horizontal line at the median (P50) of derivative (=semi-log derivative) over the data points of the identified mid-time RF sub-interval, which is shown as a solid horizontal line in FIG. 2. The most-likely estimate, i.e., (P50), of the reservoir properties (e.g. permeability, skin factor, extrapolated pressure p* etc.) are calculated by the median derivative (=y-axis) value corresponding to the mid-time RF sub-interval (135). Specifically, permeability, k, is calculated by Eq. 1 specifying $\Delta P_D = 0.5$ and $\Delta P$=the derivative value at the median value of the mid-time RF sub-interval (see horizontal line in FIG. 2), where h is the effective thickness of formation, q is the flow rate from the well, B and μ are the formation volume factor and the fluid viscosity, respectively:

$$\Delta P_D = \frac{kh\Delta p}{141.2qB\mu} \quad \text{(Eq. 1)}$$

Then, skin factor, s, is calculated by combining the following equations with Eq.1:

$$\Delta t_D = \frac{0.000264 k\Delta t}{\phi\mu c_t r_w^2} \quad \text{(Eq. 2)}$$

$$\Delta P_D = \frac{1}{2}(\ln\Delta t_D + 0.80907) + s \quad \text{(Eq. 3)}$$

The pressure change from the start of PBU, $\Delta P$, plotted in the triangle legend in FIG. 2, over the mid-time radial flow (RF) sub-interval is converted to a dimensionless pressure, $\Delta P_D$, using Eq. 1. Also, the dimensionless time, $\Delta t_D$, over the same period of time is calculated from Eq. 2 by using the permeability of the reservoir, k, derived previously, wherein Ø is the porosity of the reservoir, $c_t$ is the total compressibility of the reservoir system, $r_w$ is the wellbore radius, and $\Delta t$ is the shut-in time or equivalent time. The skin factor of the well, s, is then calculated from Eq. 3 using the derived $\Delta P_D$ and $\Delta t_D$, and calculating the median of it. Finally, extrapolated pressure, p* can be calculated by first deriving $\Delta P$ from Eqs. 1, 2 & 3 specifying a large value to shut-in time $\Delta t$, and then adding flowing pressure at the start of PBU, $P_{wf}$ to it. The calculated reservoir and well properties from this process may be used for any purpose that such information is useful in evaluating or operating the reservoir or well. It is also noted herein that the reservoir may contain a plurality of wells, including "well pairs" comprising a production well and an injection well. Such, the PBU or PFO analyses utilized herein may be associated with a particular well in the reservoir, and while the steps or uses described as follow may be applied preferably to the well to which the PBU or PFO data was associated, they may alternatively be applied to the "associated well" in a well pair (such as the corresponding production or injection well), or any other well or system of wells in the reservoir. These uses may include an analysis of the reservoir or well properties alone for purposes of, for instance, performing an economical assessment of the reservoir or well. Other purposes may include analysis of the well for predictive, operational or maintenance purposes. The information may be used, for instance, to drill an additional well or shut in an existing well. The information may be used, for instance, to modify the operational parameters of the reservoir or well, such non-limiting examples include adjusting the pressure or flow of a production well; or the pressure, flow, of an injection well, or the composition of an injection fluid introduced into an injection well. The information may alternatively be used, for instance, to perform maintenance on a well, including the timing of the maintenance, the type of maintenance, or the duration of the maintenance performed. For instance, the information may be used to perform a stimulation of a well (i.e., where acid is injected into the well to improve recovery) or a workover of a well (i.e., where portions of the well are plugged, or portions of the well are perforated or opened, to improve recovery).

This process may additionally be utilized to create digital files that contain calculated properties and log-log derivative plots with description of identified flow regime sub-intervals and store the created digital files onto a computer, local network and/or repository database. This information may be used in further analyses of the well and/or associated reservoir, as well as provide historical information related to the well and/or associated reservoir.

Optionally, the range of uncertainty of the reservoir properties (e.g., the P10 and P90 estimates) can be also calculated by locating horizontal lines at 10 and 90 percentiles, respectively, as depicted by the solid horizontal line in FIG. 2 (NOTE: Only a single horizontal line is shown in FIG. 2 for the P10, P50 and P90 values, as these are so close in value that they are difficult to distinguish from one another in FIG. 2 due to scaling) and following the same procedure as the calculation of most-likely estimate (i.e., based on the median value, P50). Here, the P10 estimate corresponds to the situation whereby there is 10 percent probability that true value of the property exceeds this estimate (i.e. high side estimate) and the P90 estimate corresponds to the situation whereby there is 90 percent probability that true value of the property exceeds this estimate (i.e. low side estimate). Although not shown in this example, other reservoir properties such as kv/kh ratio of permeability and distance between well and channel boundary can be estimated by combining RF and SF and RF and LF, respectively. Table 1 illustrates the calculated values for the reservoir and well properties from the example data in FIG. 2 utilizing the process as disclosed herein.

TABLE 1

Calculated Reservoir and Well Property Values from FIG. 2

| Reservoir Property | P10 Value | P50 Value | P90 Value |
|---|---|---|---|
| Permeability, k (mD) | 172 | 171 | 169 |
| Skin factor, s | 24 | 24 | 23 |
| Extrapolated pressure, p* (psig) | 7749 | 7749 | 7750 |

Figure 3:
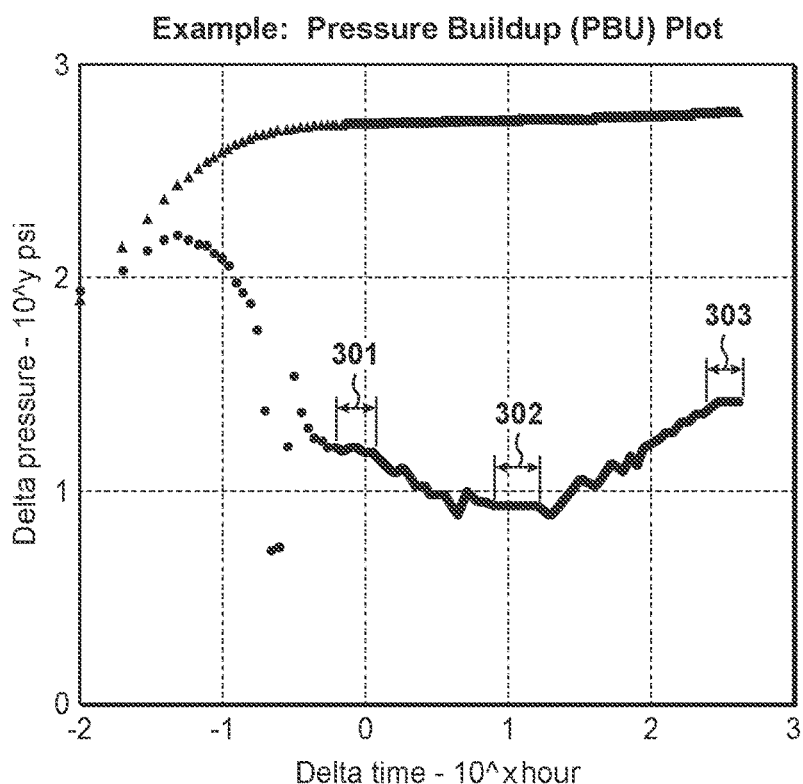
FIG. 3 illustrates multiple apparent "flat derivatives" which appear on the same log-log derivative plot as shown in FIG. 2.

The significant advantages of this invention over the previously stated automatic PTA software are twofold. First, by identifying the sequence of flow regimes on log-log derivative plot instead of merely finding the first flat derivative, this approach prevents misidentification of the mid-time RF sub-interval. FIG. 3 illustrates an example of potential misidentification of the mid-time RF sub-interval on the same log-log derivative plot as in FIG. 2. As shown in FIG. 3, there are three apparent "flat derivatives" observed in the figure shown as elements (301), (302) and (303), where (302) is the correct mid-time radial flow (RF) to be used for the calculation of reservoir properties. However, if the software merely finds the first flat derivative, it misidentifies (301) as the mid-time radial flow (RF), which results in the wrong estimation of the actual reservoir and well properties. Automatic PTA software of the prior art attempts to prevent such a misidentification by utilizing user-specified criteria such as shut-in time, (Δt used in x-axis) to start the search of a flat derivative. However, specifying such criteria is not an easy task because apparent flat derivatives often appear irregularly and unexpectedly as results of noise of data or effect of non-subsurface origin phenomena (e.g. wellbore dynamics). This invention mitigates such a problem as illustrated in FIG. 3, because the algorithm identifies mid-time radial flow (RF) by finding the flat derivative which appears "subsequent to" early time flow regime, e.g. the spherical flow (SF) in the example of FIG. 2, and "prior to" late time flow regime, e.g. the linear flow (LF) in the example of FIG. 2, through the pattern recognition that captures the sequence of flow regimes (see FIG. 2). The second advantage is that this invention utilizes the median of the derivative values to locate a horizontal line on log-log derivative plot instead of performing regression on semi-log plot to fit the straight line as implemented in the software of the prior art. Since it utilizes the median of the derivative values, this invention is robust to outliers in data unlike the regression method, because the median is insensitive to outliers.

Application of the process and systems disclosed herein is not limited to the flow scenarios of partially penetrated well and channel sand shown in the example. It is easily extended to any other flow scenarios, e.g. fully penetrated well, horizontal well, hydraulically fractured well, dual porosity reservoir, infinite-acting radial flow (=no boundary), closed boundary, steady state boundary, fault boundary, etc., which can be identified by manual PTA. For example, if the well is a horizontal well, the early time flow regime is linear flow (LF), wherein pattern of derivative is positive half slope, instead of spherical flow (SF) as seen in the example of FIG. 2, the invention is applicable to both production and injection wells. The application of the invention is not limited to downhole gauge pressure data but also applicable to pressure data measured at wellhead (or pressure data measured at wellhead and converted to downhole pressure) if condition permits (e.g. single phase flow in wellbore).

What is claimed is:

1. An automated pressure transient analysis (PTA) process, comprising:
    a) recording continuously measured well pressure data and well flow rate data from a well located in a reservoir;
    b) identifying pressure buildup intervals or pressure fall-off intervals from the well pressure data;
    c) generating a log-log derivative plot of the well pressure data for at least one of the intervals;
    d) identifying a sequence of the flow regime sub-intervals in the log-log derivative plot for the at least one interval, wherein the sequence of the flow regime sub-intervals includes an early time flow sub-interval, a mid-time radial flow (RF) sub-interval, and a late time flow sub-interval; and
    e) automatically identifying, by a pattern recognition algorithm, if an early time flow sub-interval, a mid-time radial flow sub-interval, and a late time flow sub-interval are found in the log-log derivative plot, wherein the early time flow sub-interval is identified by a particular slope, which is specific to a geometry of flow streaming into the well at early time, in the log-log derivative plot, the mid-time radial flow (RF) sub-interval is identified by a substantially zero slope in the log-log derivative plot, and the late time flow sub-interval is identified by a particular slope, which is specific to a geometry of flow streaming into the well at late time, in the log-log derivative plot;
    wherein if
        a mid-time radial flow sub-interval and
        the sequence of the flow regime sub-intervals
    are found in the log-log derivative plot, then:
    f) identifying a value of the semi-log derivative within the mid-time radial flow sub-interval;
    g) calculating at least one well/reservoir property selected from a permeability, k, a skin factor, s, and an extrapolated pressure, p*, based on the value of the mid-time radial flow; and
    h) based on the at least one well/reservoir property calculated in step g), performing at least one of:
        shutting in the well or another well located in the reservoir;
        drilling an additional well in the reservoir;
        adjusting the pressure or flow of a production well in the reservoir;
        adjusting the pressure or flow of an injection well in the reservoir;
        adjusting a composition of an injection fluid introduced into an injection well in the reservoir; and
        performing maintenance on the well or another well located in the reservoir.

2. The automated pressure transient analysis (PTA) process of claim 1, wherein the process is repeated for more than one interval.

3. The automated pressure transient analysis (PTA) process of claim 2, wherein the intervals are comprised of pressure buildup intervals.

4. The automated pressure transient analysis (PTA) process of claim 2, wherein the intervals are comprised of pressure fall-off intervals.

5. The automated pressure transient analysis (PTA) process of claim 2, wherein the value of the mid-time radial flow is the median value or the average value of the semi-log derivative values over the mid-time radial flow sub-interval.

6. The automated pressure transient analysis (PTA) process of claim 2, wherein a permeability, k, a skin factor, s, and an extrapolated pressure, p* is calculated for each interval.

7. The automated pressure transient analysis (PTA) process of claim 1, wherein if a mid-time radial flow sub-interval is not found in the log-log derivative plot, then:
   steps f), g) and h) are not performed for the interval, and
   steps c), d) and e) or performed for at least one additional interval.

8. The automated pressure transient analysis (PTA) process of claim 1, wherein the process verifies that the mid-time radial flow (RF) sub-interval occurs after the early time flow sub-interval in the interval.

9. The automated pressure transient analysis (PTA) process of claim 1, wherein the pattern recognition algorithm is a pattern matching technique based on similarity search.

10. The automated pressure transient analysis (PTA) process of claim 1, wherein the well pressure data and the well flow rate data is either historic or real-time data.

11. The automated pressure transient analysis (PTA) process of claim 1, wherein the well flow rate data is a measured rate, an estimated rate, or an allocated rate.

12. The automated pressure transient analysis (PTA) process of claim 1, wherein the well pressure data and the well flow rate data are from a fully penetrated well, a partially penetrated well, a horizontal well, a hydraulically fractured well, a well located in a channel sand, a well located in a dual porosity reservoir, a well located in an infinite-acting radial flow reservoir, a well located in a closed boundary reservoir, a well located in a steady state boundary reservoir, or a well located in a fault boundary reservoir.

13. The automated pressure transient analysis (PTA) process of claim 1, wherein the well pressure data is from a downhole pressure gauge or a pressure gauge at a wellhead of the well.

14. The automated pressure transient analysis (PTA) process of claim 1, wherein the well is a production well.

15. The automated pressure transient analysis (PTA) process of claim 1, wherein the well is an injection well.

16. The automated pressure transient analysis (PTA) process of claim 1, further comprising:
   creating one or more digital files that contain the calculated well/reservoir properties and log-log derivative plots with description of identified flow regime sub-intervals; and
   storing the created digital files onto a computer, local network and/or repository database.

17. An automated pressure transient analysis (PTA) system, comprising:
   at least one pressure gauge capable of continuously measuring well pressure data from a well located in a hydrocarbon reservoir;
   at least one of a flow meter capable of continuously measuring well flow data from the well, a virtual metering system capable of continuously estimating the well flow data, and an allocation system capable of continuously allocating the well flow data using allocation factor; and
   a computing system which records the well pressure data and well flow data;
   the computing system comprising software for the automated pressure transient analysis (PTA) of claim 1;
   wherein the computing system receives a series of pressure buildup intervals or pressure fall-off intervals and determines the mid-time radial flow (RF) sub-interval for each interval, where such radial flow (RF) sub-interval exists in the interval.

* * * * *